United States Patent [19]
Dahlheimer et al.

[11] Patent Number: 5,123,660
[45] Date of Patent: Jun. 23, 1992

[54] EXTENDED LIFE MECHANICAL FACE SEAL ASSEMBLY

[75] Inventors: John C. Dahlheimer, Laconia; Robert E. Doucette, Bristol; Kevin F. Ice, Concord, all of N.H.

[73] Assignee: Freudenberg-NOK General Partnership, Plymouth, Mich.

[21] Appl. No.: 585,651

[22] Filed: Sep. 20, 1990

[51] Int. Cl.⁵ .............................................. F16J 15/36
[52] U.S. Cl. ...................................... 277/88; 277/22; 277/42; 277/136
[58] Field of Search ................ 277/42, 43, 88, 89, 277/90, 136, 137, 22

[56] References Cited

U.S. PATENT DOCUMENTS

| | | |
|---|---|---|
| 2,322,834 | 6/1943 | Dornhofer . |
| 2,474,123 | 6/1949 | Schmitz . |
| 2,744,772 | 5/1956 | Amiranlt et al. ............ 277/43 |
| 2,785,913 | 3/1957 | Solari . |
| 2,824,760 | 2/1958 | Gits ........................ 277/43 X |
| 2,899,219 | 8/1959 | Payne . |
| 3,191,945 | 6/1965 | Andresen .................. 277/88 X |
| 3,554,559 | 1/1971 | Dahlheimer . |
| 4,095,807 | 6/1978 | Jandt et al. ............... 277/88 X |
| 4,779,876 | 10/1988 | Novosad ................... 277/22 X |

FOREIGN PATENT DOCUMENTS

| | | | |
|---|---|---|---|
| 2216815 | 11/1972 | Fed. Rep. of Germany ........ 277/43 |
| 1357122 | 2/1964 | France ................................ 277/89 |
| 998478 | 7/1965 | United Kingdom ................ 277/42 |
| 1216416 | 12/1970 | United Kingdom ................ 277/88 |
| 1246453 | 9/1971 | United Kingdom ................ 277/42 |
| 1380522 | 1/1975 | United Kingdom ................ 277/42 |

Primary Examiner—Allan N. Shoap
Attorney, Agent, or Firm—Dinnin & Dunn

[57] ABSTRACT

A rotary mechanical face seal utilizes a pair of cup-shaped inserts to closely support the contoured diaphragm of an elastomeric boot whereby the diaphragm does not actively undergo deflection to assist in sealing moving interfaces, even under fluctuations in pressure differentials acting on the diaphragm. A tubular insert is molded into the boot to assure that a fluid tight sealed securement is achieved with a bore to be sealed and accurately position components of the assembly so as to maintain the rotary sliding faces in full contact and compensate for axial tolerances of the components. A washer-shaped insert having raised lands raised from one of its axial faces can be embedded in a seal washer to ensure dimensional stability of a load bearing member and extend service life, the other axial face possibly being used as a portion of the sliding sealing faces.

16 Claims, 8 Drawing Sheets

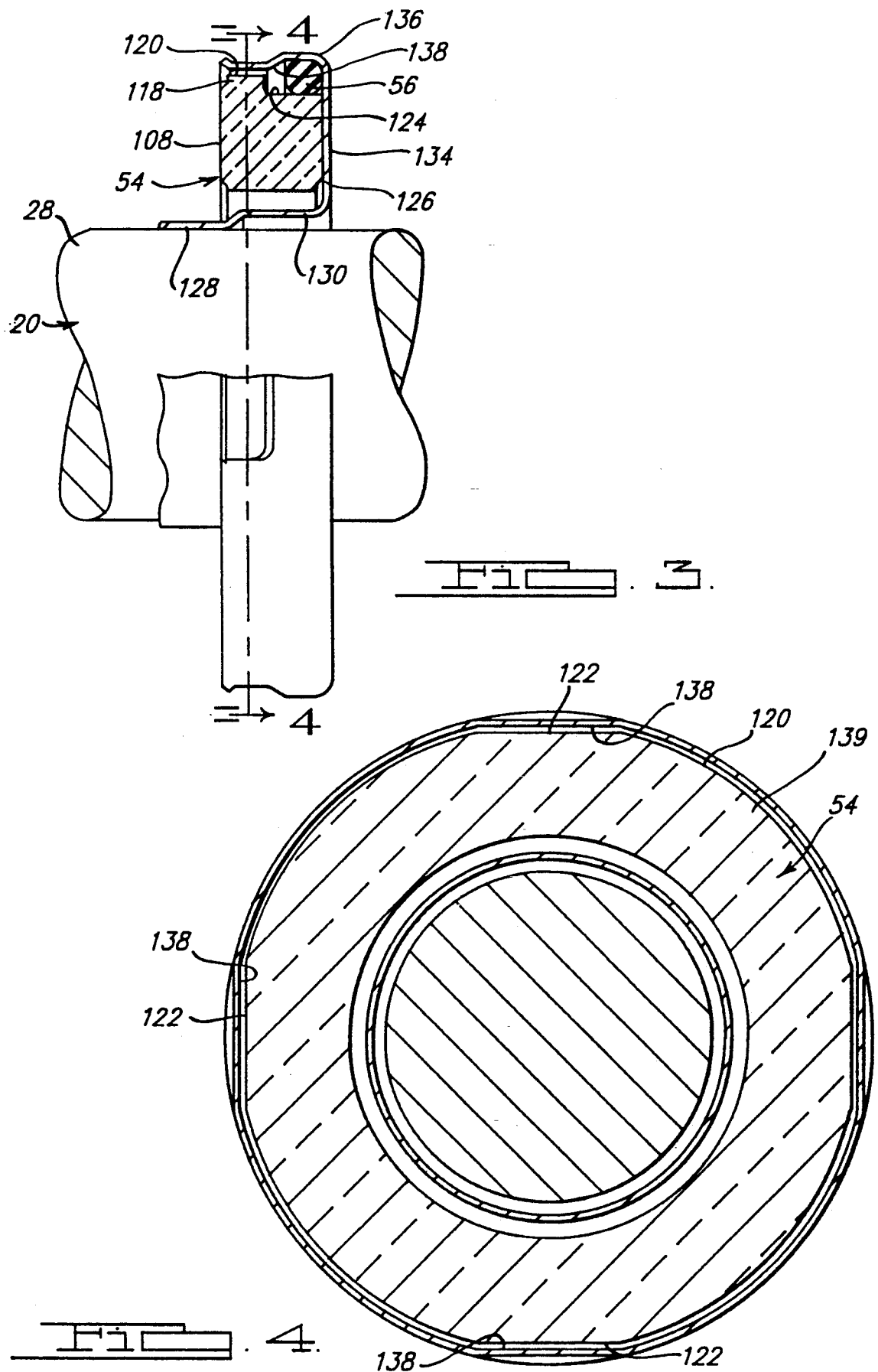

EXTENDED LIFE MECHANICAL FACE SEAL ASSEMBLY

BACKGROUND AND SUMMARY OF THE INVENTION

This invention relates to seals and sealing and has particular reference to the sealing between a pair of relatively rotatable elements such as between a shaft and a wall through within the shaft extends. For the purposes of illustration, the invention will be described with reference to a fluid seal assembly used in the water pump of an internal combustion engine.

Rotary mechanical face seal assemblies commonly used in automotive waterpumps and similar relatively low hydraulic pressure sealing applications typically include a sealing boot of a deformable elastomeric material, a seal seat, a sealing washer, a spring for biasing the sealing washer against the seal seat, and an arrangement for retaining the components in sealing relation with respect to a stationary housing and rotating shaft passing through a bore of the housing. Rotary mechanical face seals are shown in Dornhofer U.S. Pat. No. 2,322,834, issued Jun. 29, 1943; Schmitz U.S. Pat. No. 2,474,123, issued Jun. 21, 1949; Solari U.S. Pat. No. 2,785,913 issued Mar. 19, 1957; Gits U.S. Pat. No. 2,824,760, issued Feb. 25, 1958; Payne U.S. Pat. No. 2,899,219, issued Aug. 11, 1959; and Dahlheimer U.S. Pat. No. 3,554,559, issued Jan. 12, 1971, each patent being specifically incorporated herein by reference.

Oftentimes a substantial portion of the axial sealing force results from the sealing boot deflecting from its as molded free state to an as used deflected state. The force needed for this deflection normally does not actively contribute to the sealing and if needed will eventually diminish to a negligible level due to relaxation and deterioration of the elastomer. Further, the spring commonly used in these assemblies typically has a nominal spring force that is significantly higher than the minimum force required to assure proper sealing even after accommodating for normal axial tolerances of the combined components, or load tolerance in the spring, or changes in the closing force in actual service due to fluctuations in the pressure of the fluid being sealed.

A primary object of this invention is provision of an improved rotary mechanical face seal assembly containing unique features and combination of features which provide extended seal operational life by enabling the seal assembly to operate with a constant and relatively low nominal closing force regardless of the length of time in service or fluctuations in the hydraulic pressure of the fluid being sealed.

In accordance with this invention there is provided a face seal for fluid sealing between a rotatable shaft and a housing through which the shaft extends, the seal including a stationary assembly sized for fluid tight engagement to a cooperating bore in the housing and a rotating assembly securable to the shaft. In one preferred embodiment, the rotary and stationary assemblies are held together as a unit in a cylindrical casing adapted to be secured to the shaft for rotation therewithin, the rotating assembly including a seal seat mounted in a shroud formed at one end of the casing. The shroud is deformed about flats formed in the seal seat and the other end of the casing is flared outwardly to unitize the assembly and bring the parts into concentricity with one another.

The stationary assembly includes an elastomeric boot having a contoured diaphragm disposed between radially spaced annular outer and reentrant portions, an annular seal washer having a radial sealing face abutting against a like sealing face of the seal seat and an annular cavity for receiving the inner reentrant portion, a ferrule having a cylindrical body for pressing the reentrant portion against the seal washer and to lock the reentrant portion in the annular cavity, the ferrule including a radially expanding contoured skirt disposed in close supporting relation to the diaphragm and forming a first spring seat, a cup-shaped spring retainer fixedly supported about its circumference to the inner wall of the boot outer portion, the spring retainer including an annular U-shaped portion disposed in closed supporting relation to the diaphragm and a second spring seat, and a spring supported and compressed between the spring seats for biasing the ferrule and seal washer axially against the seal seat. The seal washer is preferably integrally molded of a phenolic plastic or of sintered carbon graphite, and also of a resin bonded carbon. The seal seat is preferably of ceramic or silicon carbide and supported in compression by an O-ring to inhibit cracking such as by thermal shock.

In one particular aspect of the seal herein, the annular outer portion of the boot is of thickened construction and integrally molded about a specially configured tubular insert having end flanges (or tabs), respectively, directed radially inwardly and outwardly. These flanges advantageously position the boot in the bore and the spring relative to the boot.

Further, a specially configured washer-shaped insert is integrally molded into the seal washer, the insert having angularly spaced lands disposed about a nonsealing face. Such composite seal washer has a nose portion spaced from the diaphragm and provides a means for extracting dissipating frictional heat from the sealing surface and/or interior of the seal washer and transmitting it directly to the fluid being sealed.

In yet another aspect herein interengageable fingers and recesses lock the spring seat and ferrule together in a manner which permits relative axial and minor angular movement therebetween.

An advantage of the above seal assembly is provision of a construction wherein the contoured diaphragm portion of the elastomeric boot is used in virtually the same shape in which it was originally molded such that only the spring force is necessary to bias the seal washer against the seal seat. The spring acts through the spring seats of the spring retainer and ferrule to provide virtually all of the mechanical axial closing force of the seal washer against the seal seat with virtually none of the closing force being contributed by deflection of the contoured diaphragm. The diaphragm neither effectively adds to or subtracts from the loading thus eliminating forces needed to stretch, deflect, fold, or otherwise reform the boot configuration. As such, the seal operates with nearly constant sealing force regardless of the length of time in service, or fluctuations in the temperature or hydraulic pressure of the fluid being sealed.

Another advantage of the above seal assembly construction is provided by the flanged tubular insert being molded interiorly of the thickened outer annular portion of the boot in that the tubular portion provides a leak tight and holding radial squeeze in the bore and one of the flanges holds the spring seat at a precise axial position whereat the spring retainer is installed. Because of this the spring seat can be positioned and held axially in respect to the other components of the seal assembly, whereby enabling the spring to achieve an exact and optimum amount of loading regardless of normal axial length variations in the respective components, in each and every seal assembly, regardless of deflected load tolerance in the spring itself.

Another advantage of the above seal assembly is provision of a construction wherein the contoured diaphragm is supported by closely conforming spring retainer and ferrule components, resulting in hydraulic forces being cancelled out because the effective annular area and diameters of the boot subjected to hydraulic pressure effects do not change in area or size with fluctuations in the hydraulic pressure being sealed.

Another advantage of the above seal assembly is a construction wherein the contoured diaphragm is spaced from the frictionally heated seal washer whereby to minimize both stress and heat degradation of the diaphragm in service, possible pinching of the diaphragm, or detrimental scrubbing against the seal.

An advantage of having a metal insert bonded into the seal washer is increased rigidity and dimensional stability of one of the two load bearing members. Extended life of the seal assembly is in part due to the abutting seal faces retaining their flatness, and thus their shape. Additionally, the metal insert can be used to cooperate with the seal washer to form a bearing surface.

An advantage of a seal assembly construction including the locking arrangement between the spring seat and ferrule is a means whereby to limit torsional stresses in the diaphragm and limit the rotational torque acting on the boot without destroying the cross-sectional uniformity of the seal washer. Rotational torque acting on the seal washer is transmitted through the reentrant inner portion of the boot into the ferrule, from the ferrule to the spring retainer, and from the spring retainer into the thickened outer portion of the boot, thus effectively bypassing the contoured diaphragm which connects the annular inner and outer portions of the boot. As a consequence, the fingers and recesses obviate the need for axial recesses in the seal washer itself which destroy its cross-sectional uniformity and thus lower its resistance to leakage causing distortion.

An advantage of a unitized casing in cooperation with the seal seat is provision of a "one-piece assembly" which can be marketed. Specially flaring the casing and deforming the integral shroud after the components have been assembled, respectively, enhances centering of the components and provides a driving engagement of the seal seat. The close fitting but non-distortive back-up positive drive system is easy to fabricate and assembly and has minimal effect on the cross-sectional uniformity of the seal seat component.

In the installed position of a one piece seal washer (or of a seal washer including a metal insert with raised lands spaced angularly), the outermost surfaces of the seal washer are generally exposed to the cooler ambient fluid being sealed in order to enhance removal of frictional heat.

The position of the preloading spring (or springs) can be easily varied during the manufacture of each and every seal assembly to compensate for deviations from the nominal specified combined axial lengths of all components within each and simultaneously compensate for load deviations in the springs themselves.

In another preferred embodiment, the nonrotating assembly includes a seal washer having a sealing face for bearing against a like sealing face from a disk mounted for rotation with the pump shaft, an elastomeric boot having a contoured diaphragm, and a pair of cup-shaped inserts having respective flanges which support the ends of a coil spring disposed therebetween. One of the inserts has an annular wall portion arranged to closely support a part of the diaphragm. The other insert has a cylindrical body sized to press an outer portion of the boot radially outwardly against the bore and a flange to press a portion of the boot axially against an axial end wall of the pump housing. Advantageously, the insert permit use of a spring having a lower force because the inserts do not have to bite into the diaphragm, thereby obviating a situation wherein the boot would be exposed to unnecessarily high stresses.

Although the seal assemblies will be described in detail as they are arranged in a configuration having a bore mounted stationary head portion and a shaft mounted rotating seal seat portion, the seal assembly and its component parts can be configured as one having a shaft mounted rotating seal head portion and a bore mounted stationary seal seat portion without sacrificing any of its inherent advantages.

Further object and advantages residing in the construction, arrangement and combination of features in the structural parts of the seal assemblies in accordance with this invention will become apparent from a consideration of the following detailed description with reference to the accompanying drawings in which:

BRIEF DESCRIPTION OF THE DRAWINGS

FIG. 3 is a partial longitudinal section view of a seal seat portion of the seal assembly shown in FIG. 1.

FIG. 4 is a section view taken along line 4—4 of FIG. 3.

DETAILED DESCRIPTION OF THE PREFERRED EMBODIMENT

Figure 1:
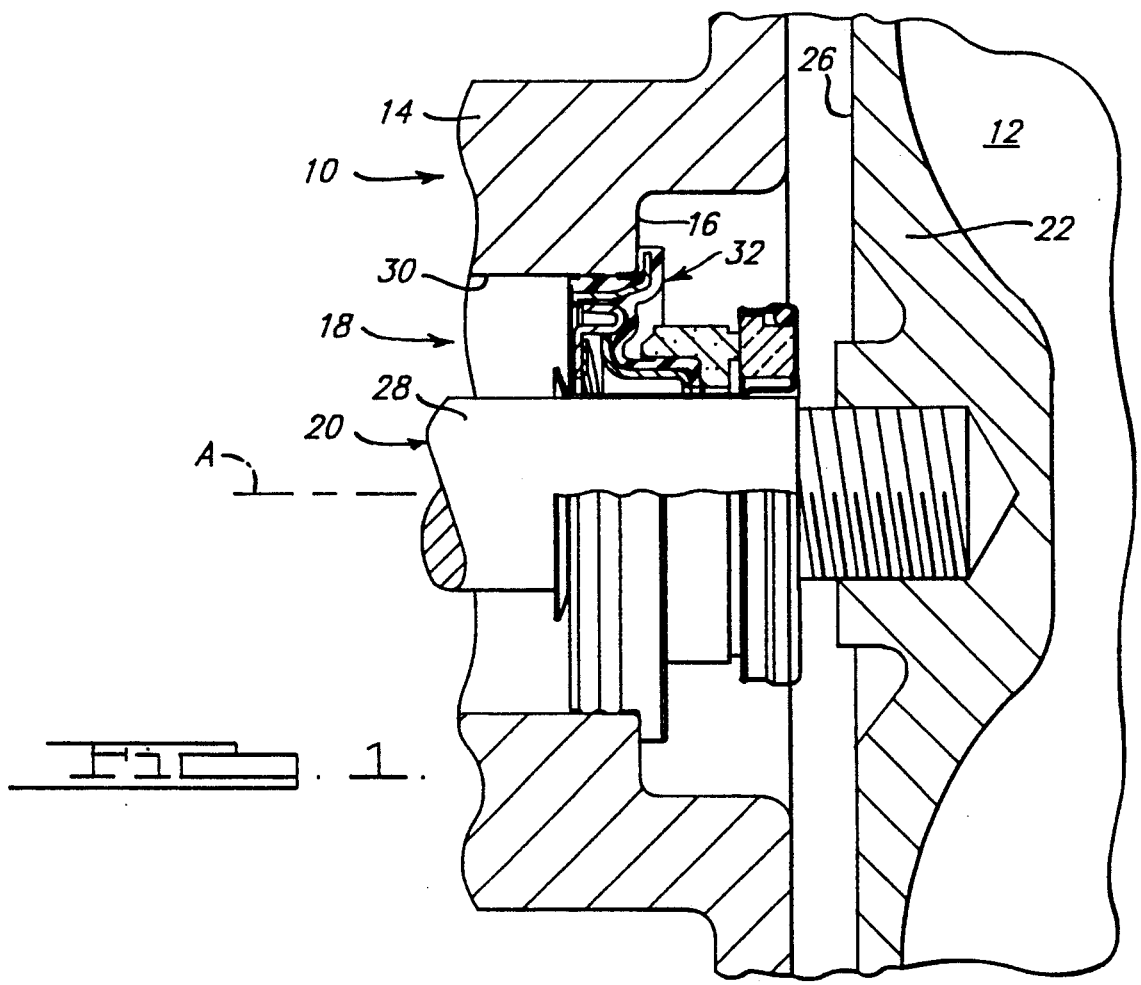
FIG. 1 is a longitudinal section view in elevation taken substantially centrally through a rotary mechanical face seal assembly constructed in accordance with the principles of the present invention and showing the seal assembly operatively installed in a pump construction.
Figure 2:
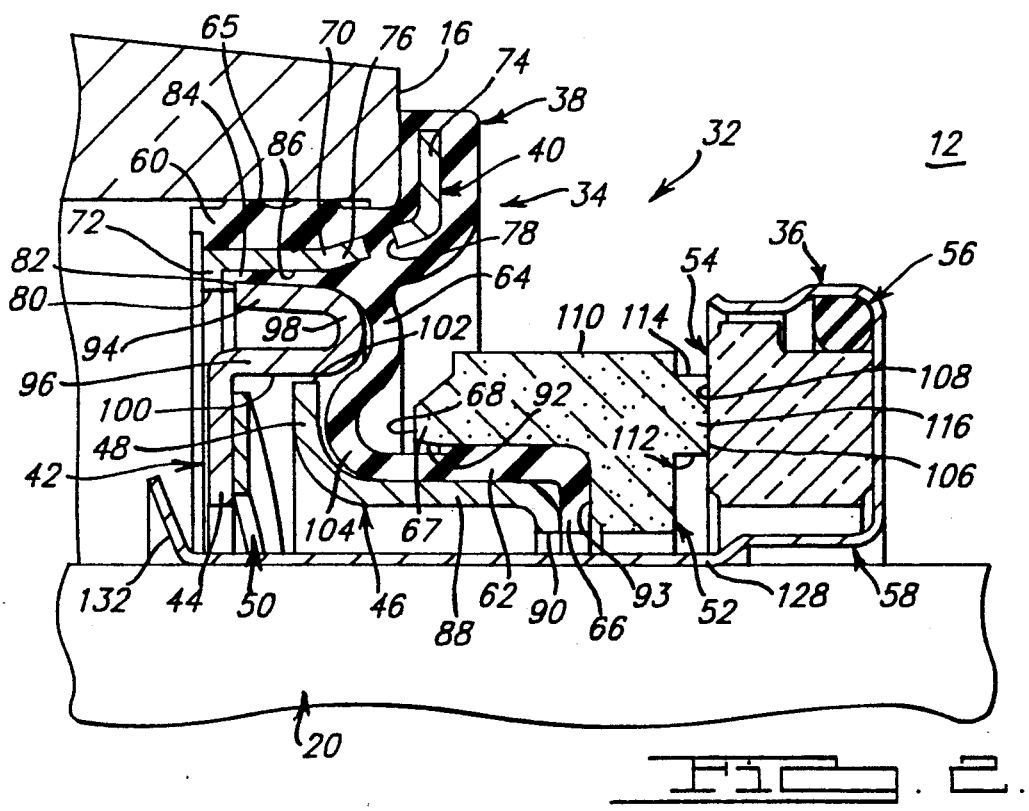
FIG. 2 is an enlarged sectional view of the face seal assembly shown in FIG. 1.

Referring now to the drawings and FIGS. 1-4 in particular, the structure selected for illustration of a typical use for the present rotary mechanical seal may be assumed to be a centrifugal impeller type pump 10 for circulating coolant 12, the pump including a stationary housing 14 having an end face 16, and an axial bore 18 extending therethrough. A cylindrical shaft 20 having an axis "A" is rotatably disposed in bore 18 and journalled in suitable bearings (not shown). Shaft 20 has an outer end (not shown) extending outwardly of housing 14 to atmosphere for connection to a fan belt or the like (not shown) and an inner end which carries an impeller 22, the impeller being surrounded by the body of coolant fluid 12. As shown, impeller 22 has an end face 26 facing towards housing 14 and is threadedly connected to the shaft for rotation therewith. Typically fluid 12 will comprise a 50—50 mixture of water and anti-freeze, such as ethylene glycol. Rotation of shaft 20 causes impeller 22 to rotate which causes the vanes thereon to drive the fluid in a whirling vortex, thereby to increase the pressure of the fluid being pumped. An annular clearance formed between the outer periphery 28 of shaft 20 and inner wall 30 forming bore 18 must be sealed to prevent leakage of fluid 12 from the housing.

A seal assembly 32 seals the bore 18 against passage of fluid therethrough and includes a stationary seal assembly 34 which is sized for a fluid tight interference fit in bore 18 and non-rotatably mounted to housing 14, and a rotatable seal assembly 36 press fitted to shaft 20 in a fluid tight interference fit for rotation therewith. The working elements of seal assembly 32 are designed to provide an efficient dynamic seal between stationary seal assembly 34 and rotating seal assembly 36, permitting free relative rotation while preventing fluid from penetrating across a moving interface. Stationary seal assembly 34 includes a flexible, deformable, tubular boot 38, a rigid insert 40, a spring retainer 42 having a flat wall 44 defining a first spring seat, a rigid ferrule 46 having a flange 48 defining a second spring seat, one or more springs 50 between the spring seats 44 and 48, and a seal washer 52, all of a generally circular shape. Rotating seal assembly 36 includes a seal seat 54, an elastomeric sealing element 56, and a unitizing casing 58, all of a generally cylindrical shape.

Boot 38 includes a thickened cylindrical sleeve 60 forming an annular outer end portion for sealing engagement with inner wall 30 of bore 18, a reentrant cylindrical sleeve 62 forming an annular inner end portion for sealing engagement with seal washer 52, and a contoured diaphragm 64 forming a flexible intermediate wall which connects the radially spaced outer and inner sleeves 60 and 62. Each of the boot portions 60, 62 and 64 are generally uniform in thickness with portions 62 and 64 being of about the same thickness but less than the thickness of portion 60. Annular ribs 65 extend radially outwardly from the outer circumference of outer sleeve 60 to engage inner wall 30, the ribs enhancing sealing, such as by adjusting for an irregular bore, and inhibiting axial and rotational movement of the sleeve relative to the bore. Preferably and in accordance with this invention, when installed and positioned for actual use, contoured diaphragm 64 is essentially stressfree and the cross-section thereof is substantially the same as the cross-section of the diaphragm as originally molded.

Contoured diaphragm 64 has faces which face in axially opposite directions and which are exposed, respectively, to fluid 12 and the air. Diaphragm 64 forms a smooth continuation between sleeves 60 and 62 and is adapted to flex axially as needed to accommodate small relative axial movement which could occur between the radially spaced inner and outer sleeves 62 and 60, such as because of pressure differentials between atmospheric pressure and the fluid pressure. Reentrant cylindrical sleeve 62 terminates in an inward radiating flange portion 66 and is of sufficient axial length to form a securing seal with seal washer 52 and space the diaphragm from the rearmost surface 68 of nose portion 67 to form an annular cavity.

Boot 38 is preferably formed of an elastomeric material such as rubber, either natural or synthetic, or a combination of the two, into a flexible cylindrical sleeve that is capable of withstanding the action of the anti-freeze, a temperature environment ranging between $-40°$ F. ($-40°$ C.) and $240°$ F. ($115.5°$ C.) and fluid pressure of 20 psi. One suitable material is HNBR, a rubber polymer that has a long term resistance to heat. For less demanding applications, an ethylene acrylic may be suitable.

Insert 40 is formed of a rigid material such as steel and molded interiorly of thickened cylindrical sleeve 60. Insert 40 includes a cylindrical body 70 having inward and outward radiating flanges 72 and 74, formed, respectively, at its opposite ends, and a frusto-conical portion 76 adjacent outward radiating flange 74. Body 70 is dimensioned to provide a leak tight and axially holding radial squeeze of outer sleeve 60 against inner wall 30 of bore 18 in the waterpump housing. Flange 74 axially positions boot 38 in bore 18 and in relation to end face 16 of the waterpump housing. Preferably, the flanges 72 and 74 are embedded in a thin membrane of the elastomeric material and frusto-conical portion 76 includes one or more through holes 78 to receive elastomeric material during molding whereby to lock insert 40 relative to the body of elastomer.

Inwardly radiating flange 72 is continuous (but could be formed from one or more angularly spaced tabs) and has an innermost end face 80 which is defined by a diameter that is less than the outermost diameter 82 of spring retainer 42 whereby to seat and hold spring seat 44 at a precise axial position and prevent axial expulsion of the spring retainer from within the insert. A thin membrane 84 of elastomer bonded to the inside wall 86 of rigid insert 40 prevents axial movement of spring retainer 42 when press-fitted into the insert.

Ferrule 46, suitably made of metal (preferably such as brass) or a rigid plastic, is cup-shaped and includes a cylindrical portion 88 having opposite ends formed, respectively, to include outward radiating flange 48 and an inward radiating flange 90. Flange 48 forms an axially extending ball-shaped skirt which expands radially outwardly. Flange 48 closely conforms to and supports the adjacent innermost segment of the diaphragm wall and the axially oppositely facing surface of the skirt forms spring seat 48 for spring 50. Cylindrical portion 88 and inward radiating flange 90 are sized, respectively, for squeezing cylindrical sleeve 62 radially outwardly against the interior wall of an annular counterbore 92 formed in seal washer 52 and for squeezing the inward radiating flange portion 66 axially against an interior end face 93 of the counterbore facing axially, the radial and axial squeezing of the elastomer being sufficient to inhibit leakage of fluid through the bore, and prevent slippage either between boot 38 and seal washer 52 or between ferrule 46 and boot 38, thereby effectively locking the ferrule 46, boot 38 and seal washer 52 together.

Spring retainer 42, made of metal (preferably such as brass) or a rigid plastic, is cup-shaped and includes an annular, generally U-shaped member having cylindrical outer and inner portions 94 and 96 and front wall portion 98, and flat wall 4 that defines the other spring seat against which spring 50 is seated. Outer portion 94 is sized to fit tightly into and against the inside wall 86 of the rigid insert 40, or against a thin membrane 84 of the elastomer bonded to the inside wall. Front wall portion 98 closely conforms to and supports the adjacent outermost segment of the diaphragm wall against hydraulic pressure tending to force the diaphragm axially. A cylindrical surface 100 of tubular inner portion 96 faces radially outwardly and centers and guides the outermost diaphragm 102 of ferrule 46 for nested seating therewithin.

Spring 50, or number of springs, preferably of metal (such as stainless steel) and of the wavy washer type, are compressed between the spring seats 44 and 48 of spring retainer 42 and ferrule 46. The axial force resulting from the compression of spring 50 is transmitted through ferrule 46 and inner radiating flange portion 66 of the boot 38 to provide an axial closing force of the seal washer 52 against the seal seat 54. The axial closing force is sufficient to assure effective dynamic tracking of seal washer 52 following any possible wobble or axial separating movement of the rotating seal seat 54 and yet no greater than necessary so as to minimize wear and heat at the sliding interface of the stationary seal face 106 and the rotating seal face 108.

Annular seal washer 52 may be molded from a heat resistant material such as sintered carbon graphite, a phenolic resin, or a resin bonded carbon. Seal washer 52 has an exterior cylindrical surface 110, a pair of annular, axially projecting, nose portions 67 and 116 terminating, respectively, at axial surfaces 68 and 106, and annular counterbore 92 which extends inwardly from surface 68 to end face 93 and defines a cavity for receiving inner sleeve 62. Surface 106 is provided with a key degree of flatness for sliding contact with like surface 108 on seal seat 54 and surfaces 110 and 68 are exposed to the surrounding fluid 12 being sealed. Essentially, sealing surfaces 106 and 108 define a plane which is perpendicular to the axis "A" of shaft 20. Advantageously, the frictional heat generated at the sliding interface between sealing surfaces 106 and 108 is easily conducted out of seal washer 52 and into the surrounding fluid.

In a preferred configuration of stationary seal assembly 34, the annular area and diameters of the flexible diaphragm wall of boot 38 which is not backed-up and supported in the axial direction by the front wall portion 98 of the spring retainer 42, but which is supported in the axial direction by the contoured portion of flange 48 radiating outwardly from ferrule 46, will closely equal the annular area as defined by outer diameter 114 of seal face 106 and the outer diameter of reentrant cylindrical sleeve 62. This configuration will effectively negate or cancel out the axial hydraulic effects of fluid pressure acting on the components of stationary seal assembly 34 so that these axial hydraulic effects will neither substantially add to or subtract from the axial closing force provided by the spring 50.

In the embodiment shown, seal seat 54 is a monolithic component made of a hard material such as metal or ceramic (such as silicon carbide) and has an integral outward radiating flange 118 whose outside periphery 120 is generally cylindrical except for one or more shallow recesses or flats 122 provided thereon. Preferably, the recesses or flats do not reduce the cross-sectional area of the seal seat by more than approximately 4% so as to not cause part distortion in service. Seal seat 54 has a smaller cylindrical shoulder 124 concentric and adjacent to the flange 118, the shoulder terminating at a rear surface 126 which is parallel with the front sealing face 108, provided with a key degree of flatness.

The elastomeric static sealing element 56 is preferably a torus shaped "O" ring whose inside diameter corresponds to the cylindrical shoulder 124 of seal seat 54. Preferably, sealing element 56 is comprised of a 70 Durometer high temperature material, such as NBR. Sealing element 56 functions to place seal seat 54 in compression and cushion seal seat 54 from thermal shock.

The case 58, preferably stamped and formed from a metal (such as stainless steel) is axially elongated, generally cylindrical, and has an inner portion 128 sized to provide a sealing and driving fit when pressed onto exterior 28 of pump shaft 20, a shroud portion 130 for captivating the seal seat 54 and sealing element 56, and a retainer lip 132 for unitizing the stationary and rotating seal assemblies 34 and 36. Shroud portion 130 includes an outward radiating rear wall 134 against which rear surface 126 of seal seat 54 and elastomeric sealing element 56 abut after they are installed, and a cylindrical wall 136 having an inside diameter 138 sized to not only freely receive flange 118 of seal seat 54 but to cooperate with the shoulder 124 of the seal seat to radially squeeze the elastomeric sealing element 56. The shoulder 124 and wall 136 cooperate to provide a squeeze that is sufficient to not only assure a static seal but provide a friction force sufficient to prevent rotational slippage between shroud portion 130, elastomeric sealing element 56, and seal seat 54.

A novel and important aspect of the construction of the rotating seal assembly 36 is that after assembling elastomeric element 56 and seal seat 54 into shroud portion 130, cylindrical wall 136 surrounding flange 118 of seal seat 54 is reformed radially inward so that it becomes smaller and develops a close, uniform and conforming clearance 139 around the flange outer periphery 120 and flats 122 provided thereon. The conforming clearance prevents distortion of the seal seat 54 yet provides a positive rotational drive between the shroud portion 130 and seal seat 54 should the elastomeric element 56 no longer resist slippage by frictional means in unusually severe or lengthy service. Preferably, the clearance 139 is less than the nominal or theoretically achievable clearance possible according to the normal manufacturing tolerances allowed on individual components. Advantageously, this clearance is easily achieved without troublesome alignment of components at assembly.

Cylindrical portion 128 of casing 58 is flared radially outwardly after assembly of all components of the seal to form the frusto-conical retaining lip 132. The retaining lip serves to hold stationary seal assembly and rotating seal assembly concentrically together and forms a unitized seal assembly for convenient handling and installation.

In previous art, achievement of an optimum or very close to optimum closing force is virtually impossible because of variations in the combed axial lengths of component parts in any given seal assembly causing variations in the installed deflection of the spring and due to the fact that the springs vary in load at any given deflection from one to another. Due to the novel construction of stationary seal assembly 34 of this seal assembly 32 the force resulting from deflection of the spring 50 can be set to an exacting amount simply by altering the installed axial position of the spring retainer 42 in relation to the rigid insert 40 which holds the spring retainer thus compensating for axial length variations in all the components of the entire unitized seal assembly 32 as well as for deflected load tolerances in the spring itself.

FIGS. 5–13 show alternate preferred embodiments of a face seal assembly in accordance with this invention. In these forms of the invention, the general overall shape and characteristics of seal assembly 32 shown in FIGS. 1-4 have been preserved. In order to eliminate needless repetition of description, similar characters of reference have been applied to the corresponding parts of the seal and its assembly, such as the shaft 20, boot 38, insert 40, spring retainer 42, ferrule 46, spring 50, seal washer 52, seal seat 54, and shroud 130.

Figure 5:
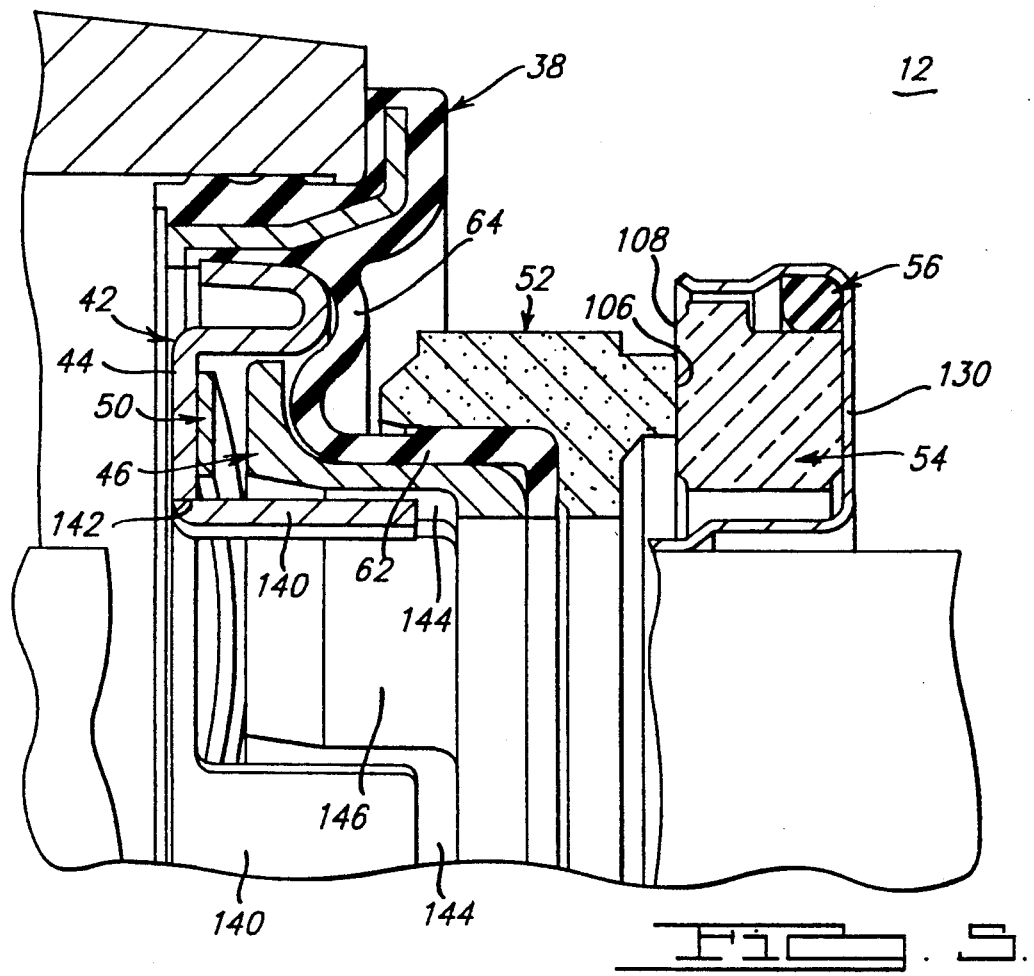
FIG. 5 is an enlarged longitudinal section view in elevation taken substantially centrally through another preferred embodiment of a rotary mechanical face seal assembly constructed in accordance with this invention.

In FIG. 5, according to this form of the invention, the stationary seal assembly is modified such that spring retainer 42 includes a finger or number of fingers 140 that project axially forward from the inner diameter 142 of the spring seat 44 to engage a corresponding axial receiving recess 144 provided in the generally cylindrical inner surface 146 of ferrule 46 thereby rotatively locking the ferrule and spring retainer together while still allowing relative axial and angular movement between the two components, thus limiting torsional stresses in the diaphragm wall 64 of the boot 38 due to torque transmitted from the rotative friction of the seal washer 52 running against the rotating seal seat 54. This novel way of limiting the rotational torque acting on the diaphragm wall obviates the need for commonly used axial recesses in the seal washer 52 itself and which destroy its cross-sectional uniformity thus causing leakage due to distortion in service.

Figure 6:
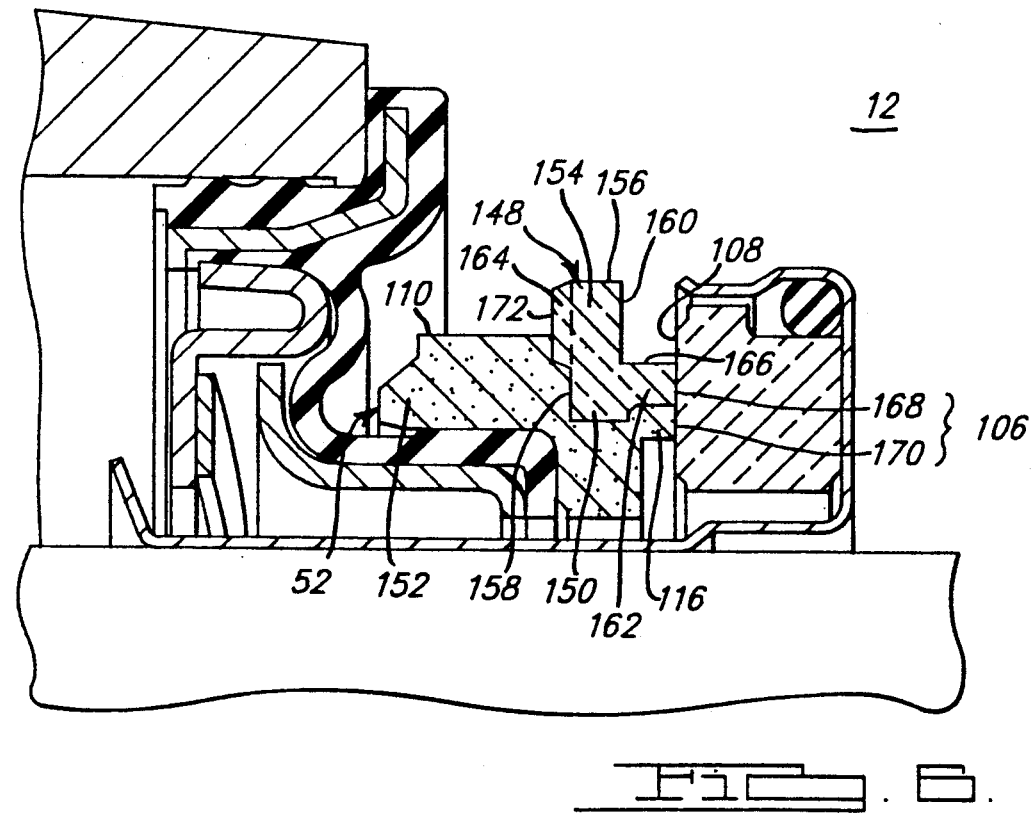
FIG. 6 is an enlarged longitudinal section view in elevation taken substantially centrally through another preferred embodiment of a rotary mechanical face seal assembly constructed in accordance with this invention.
Figure 7:
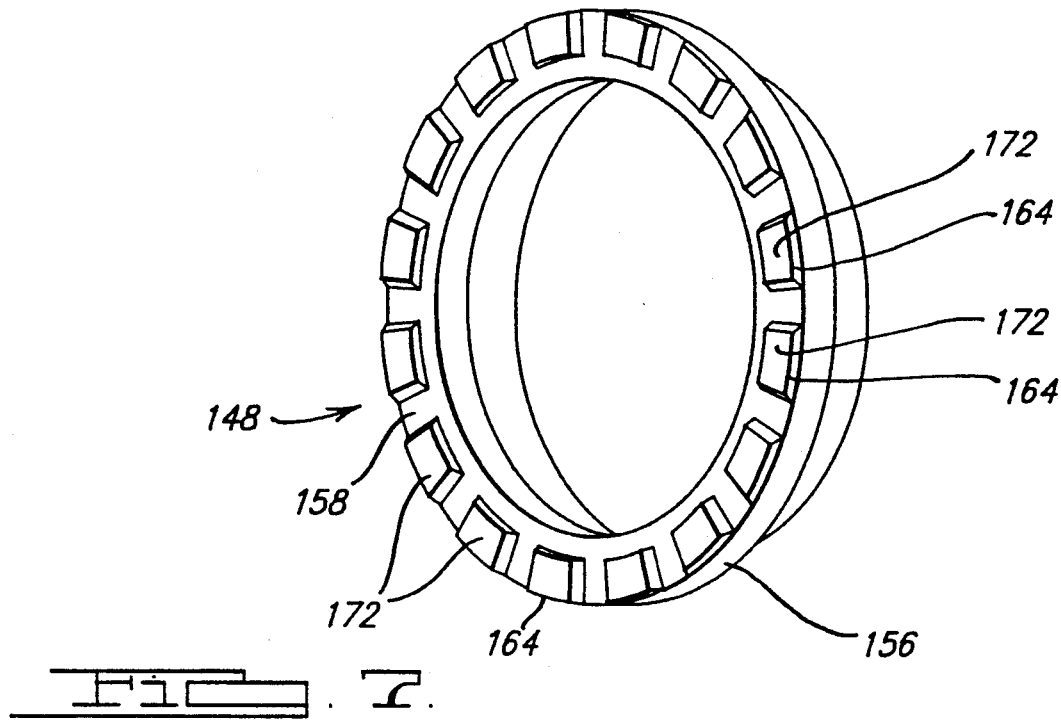
FIG. 7 is an enlarge perspective view of an insert ring used in the face seal assembly shown in FIG. 6.

In FIG. 6, according to this form of the invention, seal washer 52 has been modified to form a composite seal washer whereby a washer-shaped insert 148 has an annular inner margin 150 thereof embedded into a body 152 of heat resistance material, such as described above, and an annular outer margin 154 disposed outwardly of body 152 to transfer heat from the body into the surrounding fluid 12. Insert 148 preferably is of metal (such as sintered bronze) or a material which has friction and wear properties nearly equal to but not substantially poorer than the material from which the body is molded whereby to provide the composite seal washer with increased thermal conduction of interfacial frictional heat, and increased rigidity and dimensional stability.

Insert 148 (see FIG. 7) is generally cylindrical and cap-shaped to include an annular body having an outer circumferential face 156, planar faces 158 and 160 facing in axially opposite directions, an annular nose portion 162 (or collar) projecting from face 160, and a plurality of raised pads 164 extending from face 158. Nose portion 162 defines a circumferential surface 166 and terminates in an axially disposed annular surface 168, such that planar face 160 and cylindrical surface 156 and 166 are directly exposed to the surrounding fluid. Surface 168 cooperates with a corresponding annular surface 170 forming the end face of the nose portion 116 to form a composite flat annular seal face 106 for engaging the rotating sealing face 108 of seal seat 54. Surfaces 168 and 170 would be coplanar and provided with a key degree of flatness to engage surface 108. In some applications, a thin flash covering of plastic preferably not exceeding 0.010 inch (0.025 cm) in thickness could cover insert 148. Preferably the outward portion of annular body 152 will increase the external surface area of the seal washer exposed to the surrounding fluid by a minimum of 40% compared to a seal washer without the outward radiating flange.

In a preferred construction, insert 148 is provided with sixteen equiangularly spaced raised pads 164 each having a surface 172, the pads not increasing the cross-sectional area of the insert more than 30%. Advantageously, pads 164 interlock with and increase the area of bonding between annular body 152 molded of the plastic material and the metal insert 148 thereby reducing stress concentrations at the junction of the outermost cylindrical surface 110 of the plastic portion 150 and surface 158 of the insert 148. The terminating land surfaces 172, which define the rearmost surface of insert 148, are directly exposed to the surrounding fluid 12 or can be provided with a thin incidental flash covering of plastic, preferably not exceeding 0.010 inch (0.025 cm) in thickness.

Figure 8:
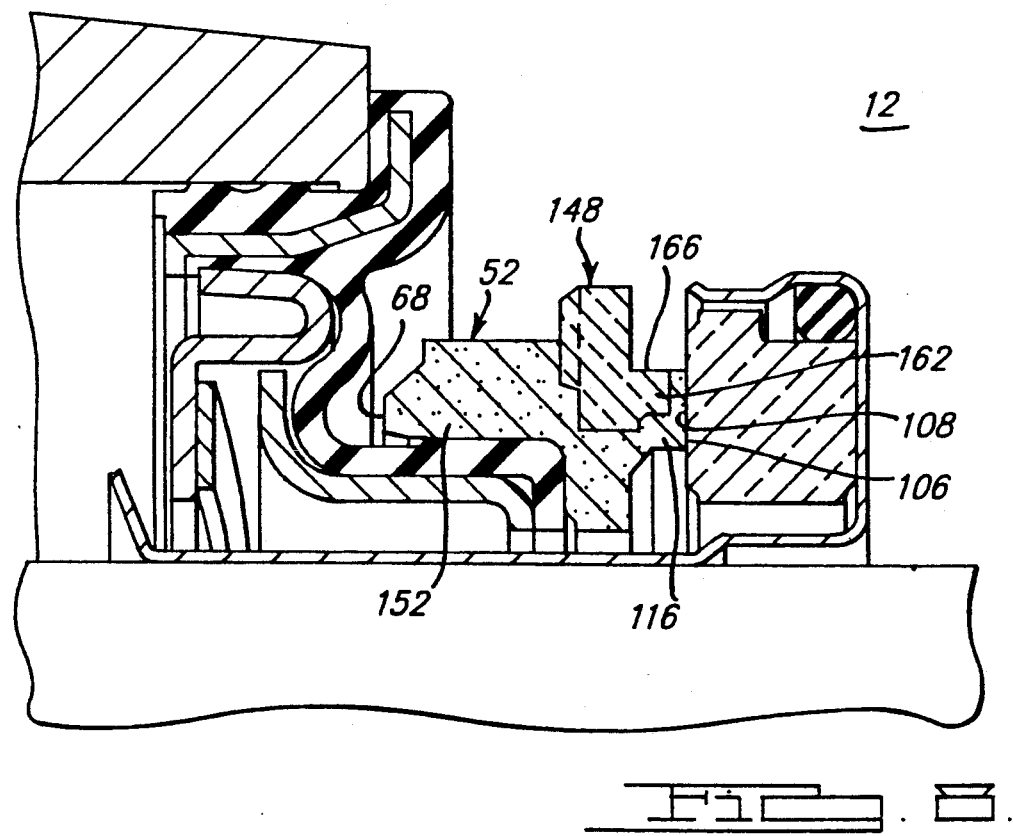
FIG. 8 is an enlarged longitudinal section view in elevation taken substantially centrally through another preferred embodiment of a rotary mechanical face seal assembly constructed in accordance with this invention.

FIG. 8 shows a variation of this alternate composite seal washer construction wherein the seal washer forms the seal face 106 at the end of nose portion 116 and the projecting annular nose portion 162 (or collar) of metal insert 148 terminates short of the flat annular seal face 106 and is embedded into the seal washer. Insert 148 has its outer circumference 166 exposed to fluid 12. Preferably, a layer of plastic of about 0.02 inch (0.05 cm) is sufficient. This variation is preferred when the metal insert 148 has friction and wear properties substantially poorer than the properties of the plastic forming seal body 152. In this variation the metal insert serves to strengthen, stabilize and increase the overall thermal conductivity of the composite seal washer 52.

Figure 9:
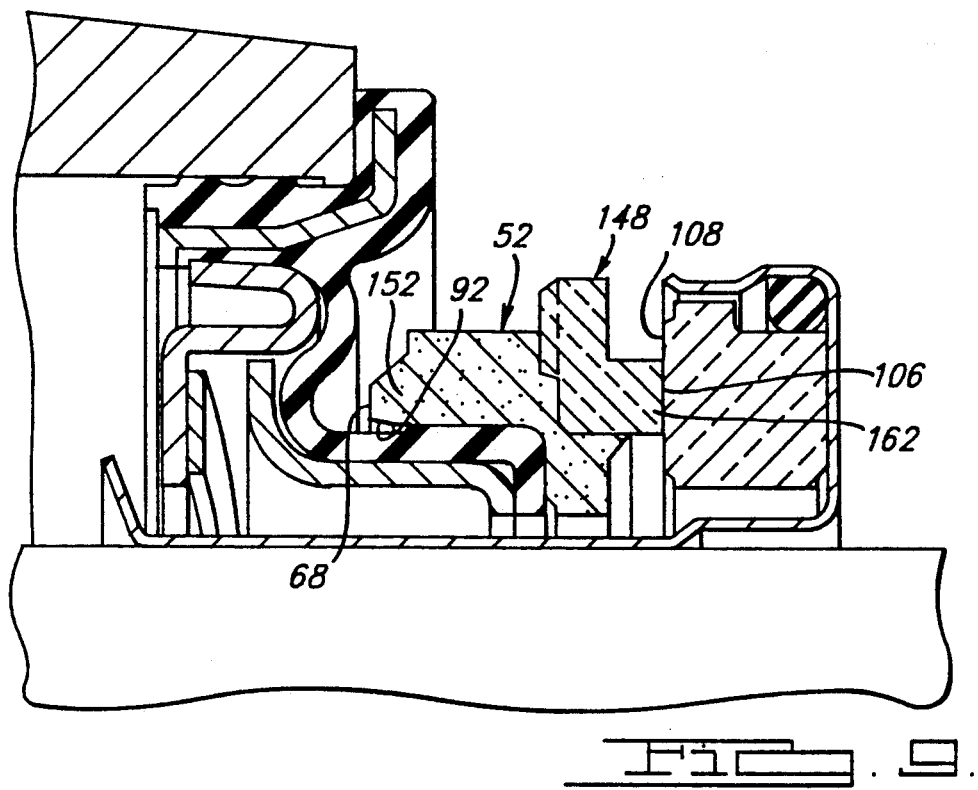
FIG. 9 is an enlarged longitudinal section view in elevation taken substantially centrally through another preferred embodiment of a rotary mechanical face seal assembly constructed in accordance with this invention.

FIG. 9 shows yet another variation of this alternate composite seal washer construction wherein the protecting annular nose portion 162 of metal insert 148 is configured to define the entire flat annular seal face 106. This variation is preferred when the metal insert 148 has friction and wear properties equal or superior to the properties of the plastic forming seal body 152. In this variation the plastic portion serves to reduce the overall weight of the composite seal washer 52 and lower the heat conducted to the counterbore 92 and rearmost annular surface 68.

Figure 10:
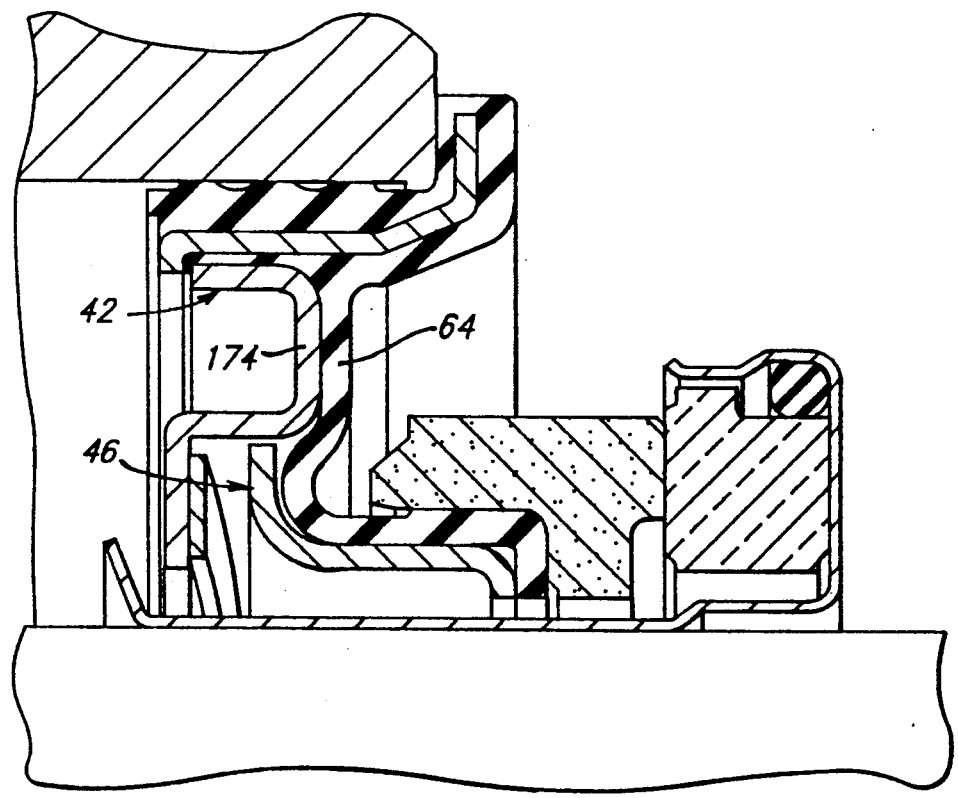
FIG. 10 is an enlarged longitudinal section view in elevation taken substantially centrally through another preferred embodiment of a rotary mechanical face seal assembly constructed in accordance with this invention.

FIG. 10 shows an alternate form of the seal assembly wherein spring retainer 42 has an enlarged U-shaped portion with a front wall portion 174 thereof providing a greater degree of support to diaphragm wall 64 and the contoured skirt 46 providing less support.

Figure 11:
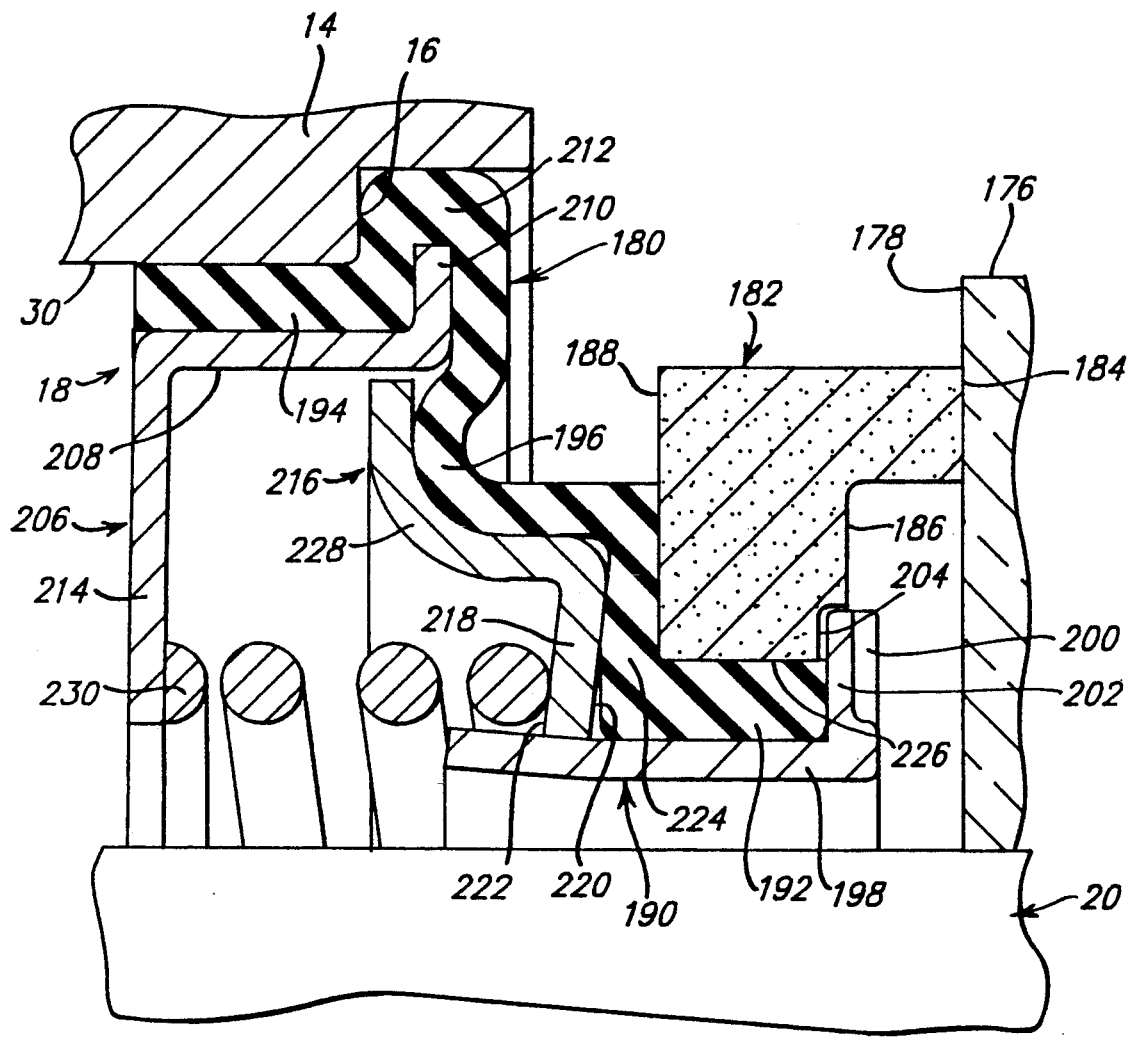
FIG. 11 is an enlarged longitudinal section view in elevation taken substantially centrally through another preferred embodiment of a rotary mechanical face seal assembly constructed in accordance with this invention.

FIG. 11 shows an alternate preferred embodiment in accordance with this invention wherein a rotating seal assembly including a seal seat 176 having an axial sealing face 178 is fixedly mounted to pump shaft 20 for rotation therewith, and a stationary assembly is mounted to bore 18 of the pump housing. The stationary assembly includes a tubular boot 180 of elastomeric material, an annular L-shaped seal washer 182 having an axial sealing face 184 arranged to coact with sealing face 178 and having surfaces 186 and 188 facing in axially opposite directions, and an elongated support sleeve 190 disposed about the pump shaft to support seal washer 182. Boot 180 has radially spaced annular inner and outer portions 192 and 194 connected by a contoured diaphragm 196, the outer portion 194 being disposed in a fluid tight sealed connection to wall 30 of bore 18. Support sleeve 190 has a cylindrical wall 198 for engaging annular inner portion 192 of boot 180 and a radial flange 200 for engaging surface 186. Interlocking projections and recesses 202 and 204 disposed, respectively, out of radial flange 200 of support sleeve 190 and in surface 186 of seal washer 182 interengage to interlock the elements against relative rotation.

A cup-shaped spring retainer 206 has a cylindrical wall 208 squeezing outer portion 194 radially against the bore, a radial flange 210 extending radially outward for axially squeezing a radially extending portion 212 of the elastomer extending from outer portion 194 against end face 16 of the housing 14, and a radial flange 214 forming a spring seat. A cup-shaped ferrule 216 includes a flange 218 having faces 220 and 222 facing in axially opposite directions with face 222 being biased axially against a radially extending portion 224 of inner portion 192. Flange 218 axially seals portion 224 of boot 180 against end face 188 of seal washer 182. Inner portion 192 is radially compressed between cylindrical wall 198 of sleeve 190 and an inner annular surface 226 of seal washer 182.

In accordance with this invention, a bell-shaped skirt 228 expands radially outwardly to define a support wall which is disposed in close supporting relation to diaphragm 196. A coil spring 230 has its opposite ends engaging flanges 214 and 218 to urge spring retainer 206 and ferrule 216 axially apart and to urge axial sealing faces 184 and 178, respectively, of the L-shaped seal washer 182 and seal seat 176 into sealed relation.

Figure 12:
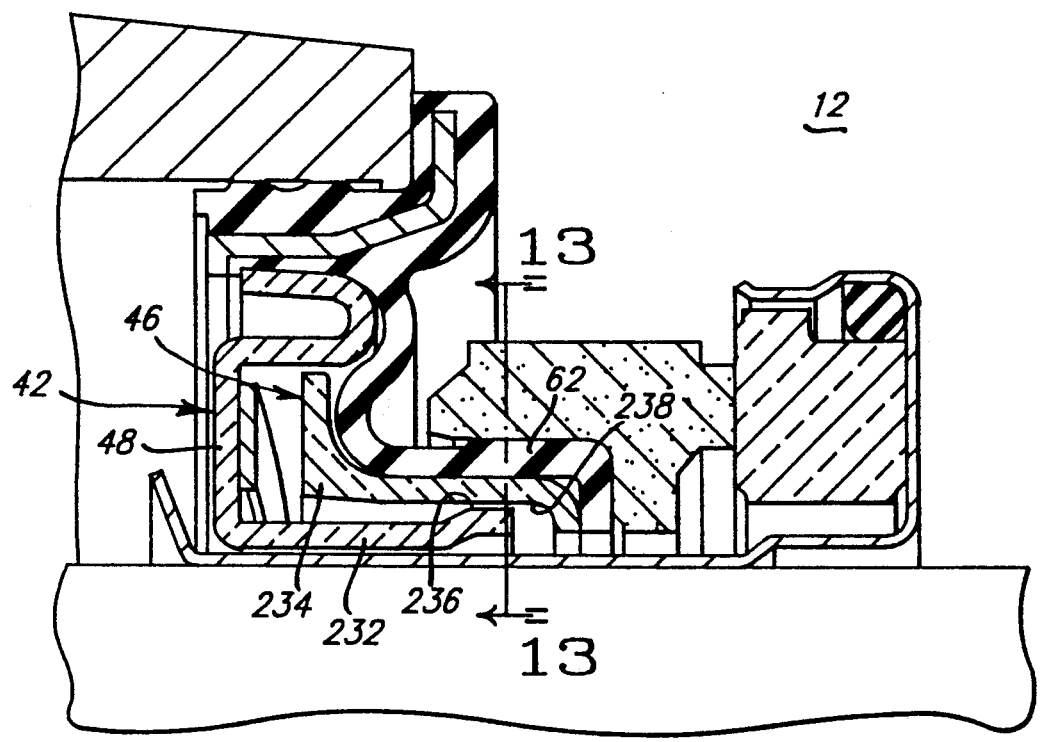
FIG. 12 is an enlarged section view in elevation substantially centrally through another preferred embodiment of a rotary mechanical face seal constructed in accordance with this invention.
Figure 13:
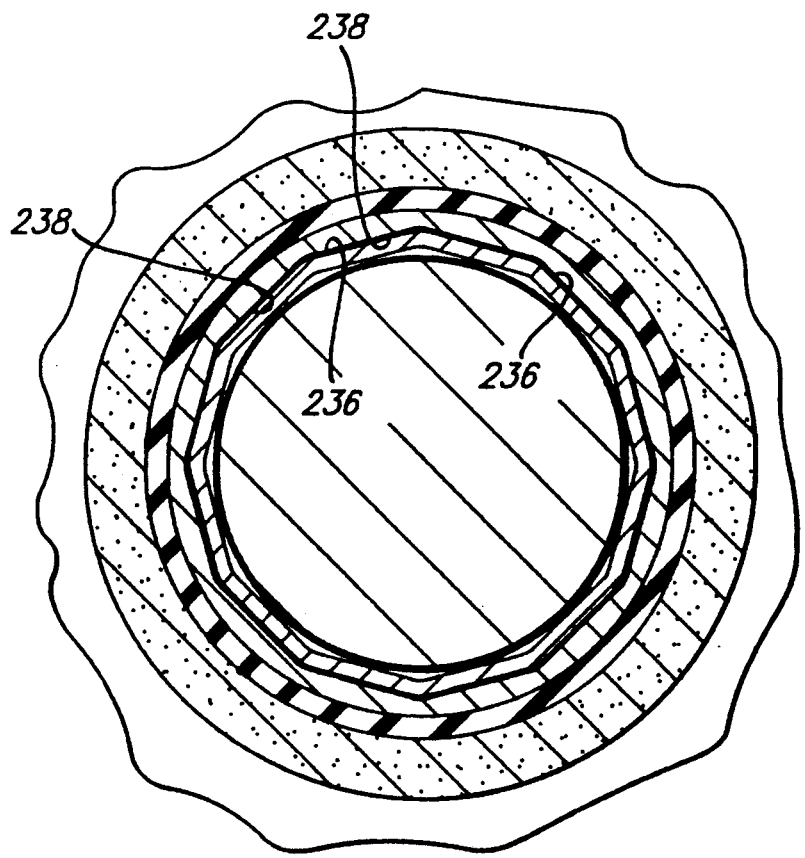
FIG. 13 is a section view taken along line 13—13 of FIG. 12.

FIGS. 12 and 13 show another alternate preferred embodiment in accordance with this invention, which embodiment is similar to that illustrated in FIG. 5. In this embodiment, a cylindrical sleeve 232 extends coaxially from flange 48 of ferrule 42 to next within the cylindrical sleeve 234 defined by ferrule 46. The respective end portions of the sleeves 232 and 234 are interlocked as a result of the end portion 232 being reformed outward to include flats 236, each flat 236 being separated by a small radial gap form a respective flat 238 provided on the inner surface of sleeve 234. The inner reentrant sleeve 62 is secured to the sleeve 234 and the flats 236 and 238 inhibit relative rotation yet allowing axial movement therebetween. In the embodiment shown twelve flats 236 are shown interlocking with twelve flats 238. Advantageously, such approach permits the spring seat to be reformed outwardly after assembly into the ferrule so as to achieve a positive interlocking drive without prior rotative orienting of the parts to one another.

Figure 14:
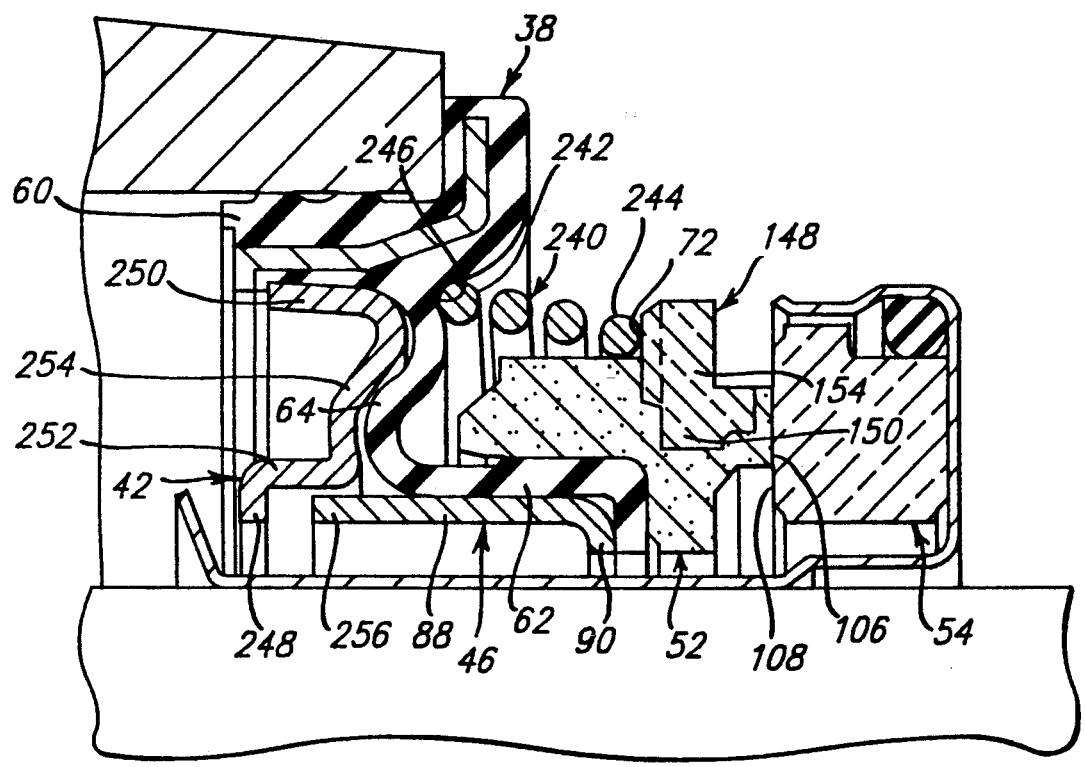

FIG. 14 shows an alternate preferred embodiment in accordance with this invention wherein a frusto-conically shaped compression coil spring 240 has opposite ends 242 and 244, respectively, engaging an annular recess 246 formed on boot 38 and the axial face 72 of seal washer 52, whereby to urge sealing faces 106 and 108 into sealed relation. Annular recess 246 is formed by the intersection of outer sleeve 60 with a radially outward portion of diaphragm 64 and defines a shoulder against which the compression spring 240 acts. Coil end 242 is greater in diameter than coil end 244 and is adapted to seat within recess 246. Coil end 244 closely conforms to the outer periphery of the seal washer and abuts face 72 of insert 148. Retainer 42 is cup-shaped and includes a radially inward generally flat wall portion 248 and a radially outward, generally U-shaped channel portion defined by cylindrical inner and outer portions 250 and 252 and front wall portion 254, the front wall portion being disposed in supporting relational with the radially outward portion of diaphragm 64. Ferrule 46 includes the cylindrical portion 88 and the flange portion 90 for pressing the inner reentrant sleeve 62 of boot 38 into sealing engagement with seal washer 52 and further includes an end portion 256 which nests within the cup portion formed by retainer 42 and positions a radially inward end portion of diaphragm 64 adjacent front wall portion 254.

As shown in this embodiment, the spring retainer 42 no longer "retains" coil spring 240 except indirectly by backing the outermost redial portion of the diaphragm 64 of boot 38. Further, coil spring 240 is disposed interiorly of coolant 12 whereas waved washer 50 shown by the previous embodiments was not exposed to the coolant 12. Depending on the application, coil spring 240 could be generally cylindrical in shape and could be other than a coil which encircles the seal washer.

While the above description constitutes the preferred embodiment(s) of the invention, it will be appreciated that the invention is susceptible to modification, variation, and change without departing from the proper scope or fair meaning of the accompanying claims.

What is claimed is:

1. A seal device for effecting a fluid tight seal between a pair of relatively rotatable elements such as a housing having a bore and an axial shaft passing through said bore, comprising an annular seal washer and an annular seal seat disposed about said shaft and each having an axial sealing face, a flexible deformable tubular boot including inner and outer sleeves disposed in radially spaced relation and a contoured diaphragm having first and second surfaces facing in axially opposite directions and extending between said sleeves, securing means securing the inner and outer sleeves in sealed relation, respectively, to said bore and said seal washer, support means extending generally axially and expanding radially outwardly and closely conforming to the contour of said first surface for supporting and inhibiting axial deformation of said diaphragm due to fluid pressure acting on said second surface, and bias means for axially urging said axial faces into mutual sliding contact, the sealed relationship being such that said contoured diaphragm as secured is substantially stress free and the cross-section thereof when in service is substantially identical to the cross-section as when molded, wherein said support means comprises a one piece ferrule having an axially elongated tubular portion and a contoured skirt extending from said tubular portion and defining a first spring seat, said ferrule having an outwardly radially facing outer surface dimensioned to engage and press said inner sleeve into sealed relation against said seal washer, and a spring retainer defining a second spring seal and including a tubular portion which radially engages said outer sleeve, said bias means comprising a spring being compressed between said first and second spring seats to bias said spring retainer and said ferrule in axially opposite directions.

2. The invention as recited in claim 1 wherein said securing means comprises a tubular insert which is dimensioned to engage and press the outer sleeve radially outwardly and against said bore.

3. The invention as recited in claim 2 wherein said insert is embedded into said outer sleeve.

4. The invention as recited in claim 1 wherein said spring comprises an annular waved washer having axial faces facing in axially opposite directions.

5. The invention as recited in claim 1, further comprising positioning means for accurately axially positioning said spring radially inwardly of said boot and adjusting the preload of said seal washer against said seal seat to achieve an exact and optimum amount of preloading irrespective of variations in axial length of components used in the device or load tolerances in said spring.

6. The invention as recited in claim 1 wherein said contoured skirt is partially disposed within said spring retainer for axial movement therewithin.

7. The invention as recited in claim 1 wherein said boot is integrally formed such that the thickness of said outer sleeve is greater than the thickness of either one of said diaphragm and said inner sleeve.

8. The invention as recited in claim 1 wherein said securing means comprises a rigid tubular insert being integrally molded to said outer sleeve, said tubular insert being dimensioned to squeeze an outer annular portion of said outer sleeve radially outwardly against said bore.

9. The invention as recited in claim 1 wherein said boot is molded of an elastomeric material, said outer sleeve is substantially thicker than the thickness of either one of said diaphragm and said inner sleeve, and said securing means includes a tubular insert being embedded into the elastomer of said outer sleeve, the tubular insert being dimensioned to radially squeeze an outer annular portion of the outer sleeve against said bore.

10. The invention as recited in claim 9 wherein said tubular insert includes a tubular body having at least one opening therethrough sized to receive said elastomer whereby to interlock said insert relative to said outer sleeve and to provide an enhanced uniform radial squeezing force of said elastomer with said bore.

11. The invention as recited in claim 9 further comprising a first flange extending radially outwardly from said tubular insert for seating against an axial face of said housing to position the inward axial extension of said outer sleeve in said bore, a second flange extending radially inwardly from said tubular insert, and said spring retainer seated against said second flange for supporting said spring at a preselected position relative to said outer sleeve and supporting and axially positioning the spring retainer.

12. The invention as recited in claim 1 wherein said tubular portion of said ferrule encircles said shaft and includes a flange portion extending radially inwardly, and said seal washer includes an annular cavity dimensioned to receive said inner sleeve, the tubular flange portions of said ferrule being dimensioned to press said inner sleeve into a sealed captivated relation against the wall of the annular cavity.

13. The invention as recited in claim 1 further comprising a cylindrical casing rigidity secured to said shaft for rotation therewith, said casing including captivating means for captivating said seal seat for rotation therewith and in a manner whereby the axial sealing face of said seal seat is bearing against the corresponding sealing face on said seal washer.

14. The invention as recited in claim 13 wherein the captivating means comprises said casing being formed with a cylindrical shroud that encloses said seal seat, and a flat on said seal seat and said shroud, respectively, said flats being registered with one another whereby to complete a locked driving connection between said shroud and said seal seat.

15. The invention as recited in claim 14 wherein said captivating means further includes resilient means interposed between the outer circumference of said seal seat and an inner wall of said shroud for sealing and compressing the seal seat radially inwardly.

16. The invention as recited in claim 1 wherein said contoured skirt extends from a location proximate said inner sleeve and expands radially outwardly to a location proximate said outer sleeve.

* * * * *